(12) United States Patent
Krishna et al.

(10) Patent No.: US 9,652,369 B2
(45) Date of Patent: *May 16, 2017

(54) EXTRACTION OF PROBLEM DIAGNOSTIC KNOWLEDGE FROM TEST CASES

(71) Applicant: International Business Machines Corporation, Armonk, NY (US)

(72) Inventors: Hariharan Krishna, Hyderabad (IN); Arun Ramakrishnan, Chennai (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,163

(22) Filed: Jun. 7, 2016

(65) Prior Publication Data
US 2016/0283363 A1   Sep. 29, 2016

Related U.S. Application Data

(63) Continuation of application No. 15/071,252, filed on Mar. 16, 2016, which is a continuation of application No. 14/327,983, filed on Jul. 10, 2014, now Pat. No. 9,348,739.

(51) Int. Cl.
*G06F 9/44* (2006.01)
*G06F 11/36* (2006.01)
*G06N 5/02* (2006.01)

(52) U.S. Cl.
CPC ............ *G06F 11/3688* (2013.01); *G06F 8/70* (2013.01); *G06F 11/368* (2013.01); *G06F 11/3612* (2013.01); *G06F 11/3676* (2013.01); *G06F 11/3692* (2013.01); *G06N 5/025* (2013.01)

(58) Field of Classification Search
CPC .................. G06F 11/3692; G06F 11/3688
See application file for complete search history.

(56) References Cited

U.S. PATENT DOCUMENTS 6,760,722 B1 *  7/2004  Raghunandan ........ G06N 5/046
7,360,120 B2     4/2008  De Pauw et al.
7,448,039 B2    11/2008  Green et al.
(Continued)

OTHER PUBLICATIONS

Zawawy et al.; "Log Filtering and Interpretation for Root Cause Analysis"; 26th IEEE International Conference on software Maintenance in Timisoara, Romania; Copyright 2010.
(Continued)

*Primary Examiner* — Philip Wang
(74) *Attorney, Agent, or Firm* — Lance I. Hochauser; Noah A. Sharkan

(57) ABSTRACT

Embodiments of the present invention enable users to extract knowledge from testing scenarios performed during application development, and later employ that knowledge to interpret application usage scenarios to enhance serviceability of applications by expediting identification and solving of problems. In an exemplary embodiment, log data generated during simulation of test cases is analyzed to create one or more rules based on patterns in which one or more log entries appear in the log data. Later, log data may be analyzed to look for a pattern of log entries that matches a pattern-based rule, thereby facilitating faster identification and resolution of the problem.

20 Claims, 4 Drawing Sheets

(56) References Cited

U.S. PATENT DOCUMENTS

| | | | | |
|---|---|---|---|---|
| 7,836,346 | B1 * | 11/2010 | Davidov | G06F 11/3692 714/38.1 |
| 8,402,446 | B2 | 3/2013 | Singh | |
| 2003/0125904 | A1 * | 7/2003 | Ueki | G06F 11/3616 702/181 |
| 2005/0283680 | A1 * | 12/2005 | Kobayashi | G06F 11/3636 714/39 |
| 2007/0006037 | A1 * | 1/2007 | Sargusingh | G06F 11/3692 714/38.11 |
| 2010/0199263 | A1 * | 8/2010 | Clee | G06F 8/71 717/125 |
| 2012/0143893 | A1 | 6/2012 | Abraham | |
| 2012/0192156 | A1 | 7/2012 | Clee et al. | |
| 2013/0290938 | A1 | 10/2013 | Nir et al. | |
| 2013/0311977 | A1 * | 11/2013 | Nieminen | G06F 11/3672 717/135 |
| 2014/0122932 | A1 * | 5/2014 | Chen | G06F 11/079 714/37 |
| 2016/0011960 | A1 | 1/2016 | Krishna et al. | |
| 2016/0196203 | A1 | 7/2016 | Krishna et al. | |

OTHER PUBLICATIONS

Authors et al: IBM; "Automated result evaluation and defect identification by using an explicit rule engine"; An IP.com Prior Art Database Technical Disclosure; Original Publication Date: Feb. 9, 2009; IP.com No. IPCOM000179198D; IP.com Electronic Publication: Feb. 9, 2009; pp. 6; <http://ip.com/IPCOM/000179198>.

Authors et al.: IBM; "Automatic test log analysis"; An IP.com Prior Art Database Technical Disclosure; Original Publication Date: Jul. 29, 2009; IP.com No. IPCOM000185634D; IP.com Electronic Publication: Jul. 29, 2009; pp. 3; <http://ip.com/IPCOM/000185634>.

Disclosed Anonymusly; "Method for automatically using the result of automated log analysis to manage defects in the defects management system"; An IP.com Prior Art Database Technical Disclosure; IP.com No. IPCOM000198632D; IP.com Electronic Publication: Aug. 11, 2010; pp. 4; <http://ip.com/IPCOM/000198632>.

Hariharan, et al., U.S. Appl. No. 14/327,983, filed Jul. 10, 2014.

Hariharan, et al., U.S. Appl. No. 15/071,252, filed Mar. 16, 2016.

* cited by examiner

EXTRACTION OF PROBLEM DIAGNOSTIC KNOWLEDGE FROM TEST CASES

BACKGROUND OF THE INVENTION

The present invention relates generally to the field of software application development, and more particularly to employing knowledge extracted from application development test cases to interpret application usage scenarios.

Application code is tested and refined during many stages of application development. Typically, application developers simulate test cases (i.e., usage scenarios) to debug application code and/or otherwise identify and rectify problems with an application before and after deployment of the application. For example, there exist integrated development environments (IDEs) with which developers can write, test, and debug application code. IDEs can also be integrated with other tools for automated simulation of test cases, such as tools which test various elements of a graphical user interface (GUI) or other functionalities of an application.

Compiling problem diagnostic knowledge in application development and serviceability contexts is typically a reactive, tedious, and largely manual process. For example, problem diagnostic knowledge is typically created in response to a user encountering and reporting a problem, and creating such knowledge requires expertise and significant investments of time and energy to identify, resolve, and document problems and solutions for the expansive number of scenarios that may be encountered by users.

SUMMARY

According to one aspect of the present invention, there is a method comprising: receiving, by one or more computer processors, a first set of log data generated during execution of application code in a first scenario; processing, by one or more computer processors, the first set of log data to identify one or more log entries appearing in the first set of log data; creating, by one or more computer processors, a rule based on a pattern of the identified one or more log entries appearing in the first set of log data; associating, by one or more computer processors, the rule with information describing the first scenario; and storing the rule and the information describing the first scenario in a database.

DETAILED DESCRIPTION

Embodiments of the present invention enable users to extract knowledge from testing scenarios performed during application development, and later employ that knowledge to interpret application usage scenarios to enhance serviceability of applications by expediting identification and resolution of problems. Furthermore, embodiments of the present invention enable users to extract knowledge from application usage scenarios to supplement knowledge extracted during application development and/or document new knowledge.

In an exemplary embodiment, log data generated during simulation of test cases is analyzed to create one or more rules based on a pattern in which one or more log entries appear in the log data. The pattern-based rules are stored along with knowledge of the test case (e.g., description of what was tested, expected results, known problems and solutions, symptoms of related problems, etc.) in a knowledge database. Later, such as in a servicing context, an end-user may provide log data generated when using the application and encountering a problem (e.g., a crash report). The log data provided by the end-user is analyzed to look for a pattern of log entries that matches a pattern-based rule and, if a match is found, the stored knowledge of the test case to which the pattern-based rule is associated is provided to the appropriate persons to facilitate identification and resolution of the problem.

Figure 1:
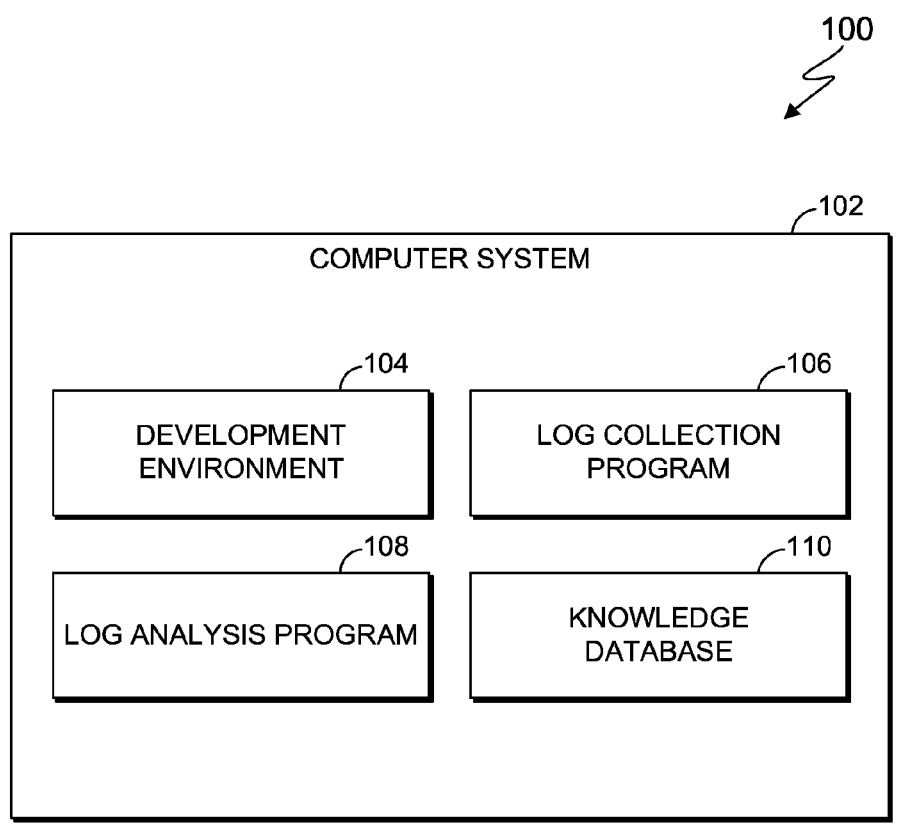
FIG. 1 is a block diagram of a computing environment, in accordance with an embodiment of the present invention.

FIG. 1 is a functional block diagram of computing environment 100, in accordance with an embodiment of the present invention. Computing environment 100 includes computer system 102. Computer system 102 can be a desktop computer, laptop computer, specialized computer server, or any other computer systems known in the art. In certain embodiments, computer system 102 represents computer systems utilizing clustered computers and components to act as a single pool of seamless resources when accessed through a network. For example, such embodiments may be used in data center, cloud computing, storage area network (SAN), and network attached storage (NAS) applications. In certain embodiments, computer system 102 represents a virtual machine. In general, computer system 102 is representative of any electronic device, or combination of electronic devices, capable of executing computer-readable program instructions, as described in greater detail with regard to FIG. 4.

Computer system 102 includes development environment 104, log collection program 106, log analysis program 108, and knowledge database 110. Development environment 104 enables a user to develop applications and simulate test cases (i.e., usage scenarios) on those applications. In this exemplary embodiment, development environment 104 comprises an IDE, such as Eclipse. In general, development environment 104 can be implemented with any known software solutions that enable a user to develop application code and simulate test cases, in accordance with embodiments of the present invention.

Log collection program 106 is a monitoring agent that collects log data that is generated by development environment 104 during simulations of test cases. In this exemplary embodiment, during execution of test cases, application code executing within development environment 104 generates log data comprising one or more log entries, and log collection program 106 interacts with development environment 104 to collect the log data and associate the one or more log entries with the particular line(s) of application code that generated those log entries, and with information pertaining to the particular test case being simulated at that time. The information pertaining to the test case may include, for example, an identification number, descriptive information as to which aspects of the application are being tested (e.g., interface elements, subroutines, functionalities, etc.), expected results (e.g., pass/fail), known issues, and other developer comments. Such test case information may be inputted manually by a user and/or may be generated automatically by development environment 104 or another tool. In this manner, log collection program 106 captures a record of the portions of application code and collected log data which correspond to a given test case. In some instances, there may also be overlap between different test cases and the portions of log data and application code to which they correspond.

Log analysis program 108 receives collected log data and analyzes the collected log data to identify one or more log entries appearing in the log data. In this exemplary embodiment, log analysis program 108 isolates the one or more log entries from other log data (e.g., run-time data) and preserves the chronological order in which the one or more log entries appear in the log data. As discussed later in this specification, in some instances, log analysis program 108 creates one or more rules based on a pattern in which one or more log entries appear in the log data and stores the rules in knowledge database 110, along with information pertaining to associated test cases and portions of application code from which the log data resulted. In other instances, log analysis program 108 analyzes log data to determine whether a pattern of log entries therein matches a pattern-based rule stored in knowledge database 110.

Knowledge database 110 is used to store problem diagnostic knowledge for applications. In this exemplary embodiment, knowledge database 110 stores pattern-based rules created by log analysis program 108, along with information pertaining to test cases and portions of application code associated with those pattern-based rules. Knowledge database 110 can be implemented using any database architecture known in the art, such as a relational database, an object-oriented database, and/or one or more tables. Similarly, in other embodiments, knowledge database 110 can be hosted remotely and accessed by computer system 102 via a network (e.g., a local area network (LAN), a wide area network (WAN), such as the Internet, or a combination of the two).

It should be understood that, for illustrative purposes, FIG. 1 does not show other computer systems and elements which may be present when implementing embodiments of the present invention. For example, while FIG. 1 shows a single computer system 102, computing environment 100 can also include additional computer systems on which log data is generated and/or analyzed.

Figure 2:
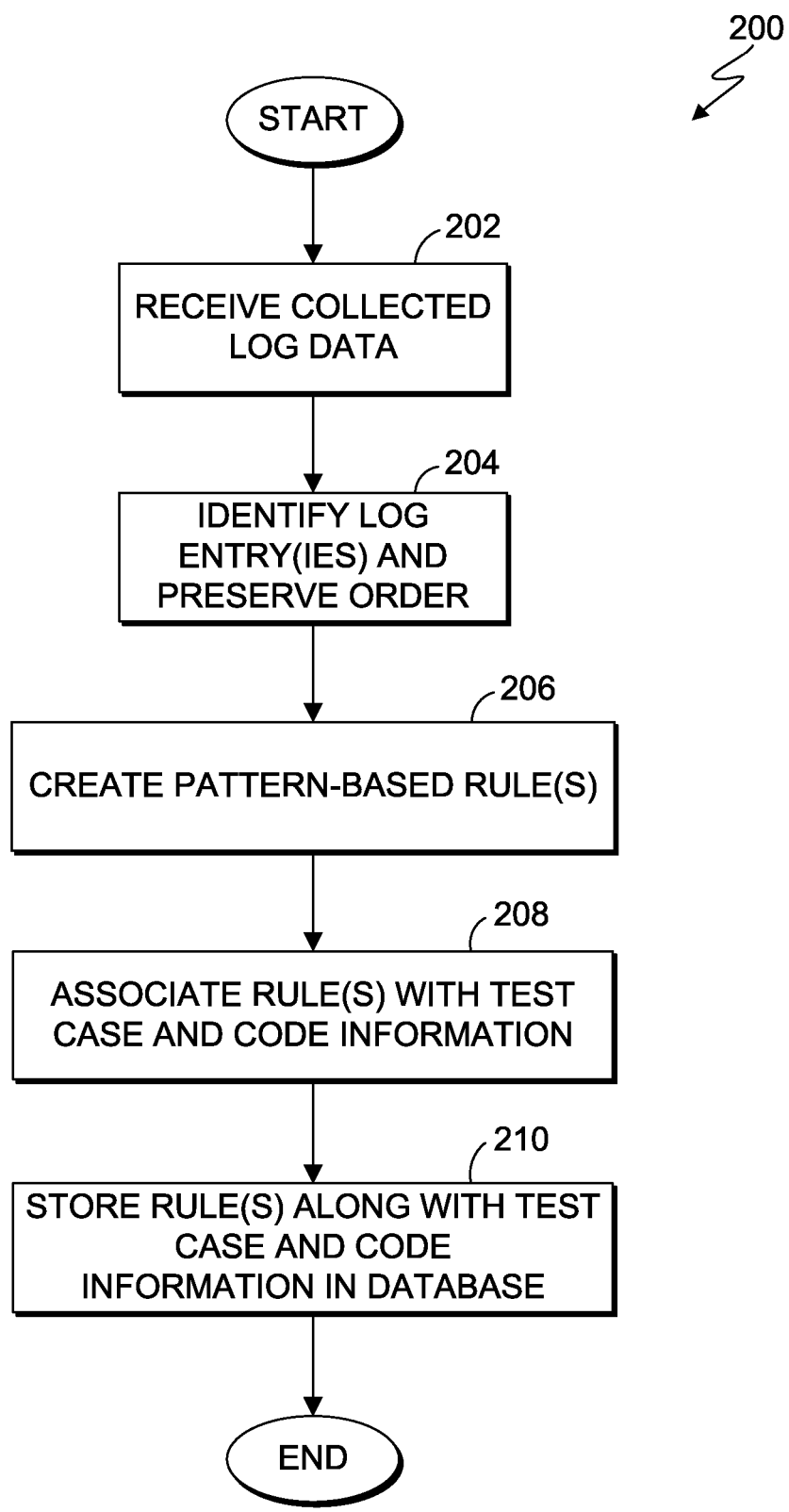
FIG. 2 is a flowchart illustrating operational steps for analyzing log data to create a pattern-based rule that corresponds to a test case, in accordance with an embodiment of the present invention.

FIG. 2 is a flowchart 200 illustrating operational steps for analyzing log data generated by development environment 104 to create and store a pattern-based rule that corresponds to a test case, in accordance with an embodiment of the present invention. For illustrative purposes, the following discussion is made with respect to creation of a single pattern-based rule associated with a single test case, but it should be understood that multiple pattern-based rules may be created and associated with multiple test cases.

In step 202, log analysis program 108 receives collected log data from log collection program 106. As previously discussed, the collected log data is collected during execution of a test case and comprises one or more log entries associated with information pertaining to the test case and application code (e.g., pointers to particular lines of application code) from which the one or more log entries resulted.

In step 204, log analysis program 108 processes the collected log data to identify the one or more log entries therein, while preserving the order in which the one or more log entries appear in the log data. In this exemplary embodiment, log analysis program 108 isolates the one or more log entries by removing portions of the log data that are not log entries (e.g., run-time data). In other embodiments, log analysis program 108 may identify the one or more log entries appearing in the log data without removing portions of the log data.

In step 206, log analysis program 108 creates a rule based on a pattern of the one or more log entries appearing in the log data. In this exemplary embodiment, the pattern-based rule is defined with respect to both the content of the one or more log entries and, to the extent there are multiple log entries, the order in which the log entries appear in the log data. A user may specify which content of the one or more log entries is used to define the pattern-based rule, such as the entirety of the log entry (e.g., the entire output string), a portion of the log entry (e.g., a log message identifier), and/or some other distinct attribute of the log entry. For example, the pattern-based rule may take the form of a required chronological sequence of specific log entries, or the presence of one or more specific log entries, in conjunction with the absence of other specific log entries.

Pattern-based rules may be created automatically by log analysis program 108. For example, log analysis program 108 may parse the log data to identify content of the one or more log entries in accordance with the user's specification (e.g., identify output strings, log message identifiers, etc.), and then create a rule that corresponds to the identified content and the order in which the identified content of the one or more log entries appears in the log data. Pattern-based rules may also be created manually by a user. For example, a user may view the collected log data and define a pattern-based rule based upon content and a chronological sequence of log entries he or she sees in the log data. Pattern-based rules may also be created using a combination of both of the aforementioned techniques. For example, log analysis program 108 may automatically parse the log data and create a pattern-based rule, after which a user reviews and refines the rule based on knowledge of the application code and log messages. A more detailed example of log data and pattern-based rules is discussed later in this specification.

In step 208, log analysis program 108 associates the pattern-based rule with the information pertaining to the test case and application code from which the one or more log entries resulted.

In step 210, log analysis program 108 stores the pattern-based rule, along with the information pertaining to the test case and application code, in knowledge database 110. In other embodiments, log analysis program 108 may also store the log data itself in knowledge database 110.

Figure 3:
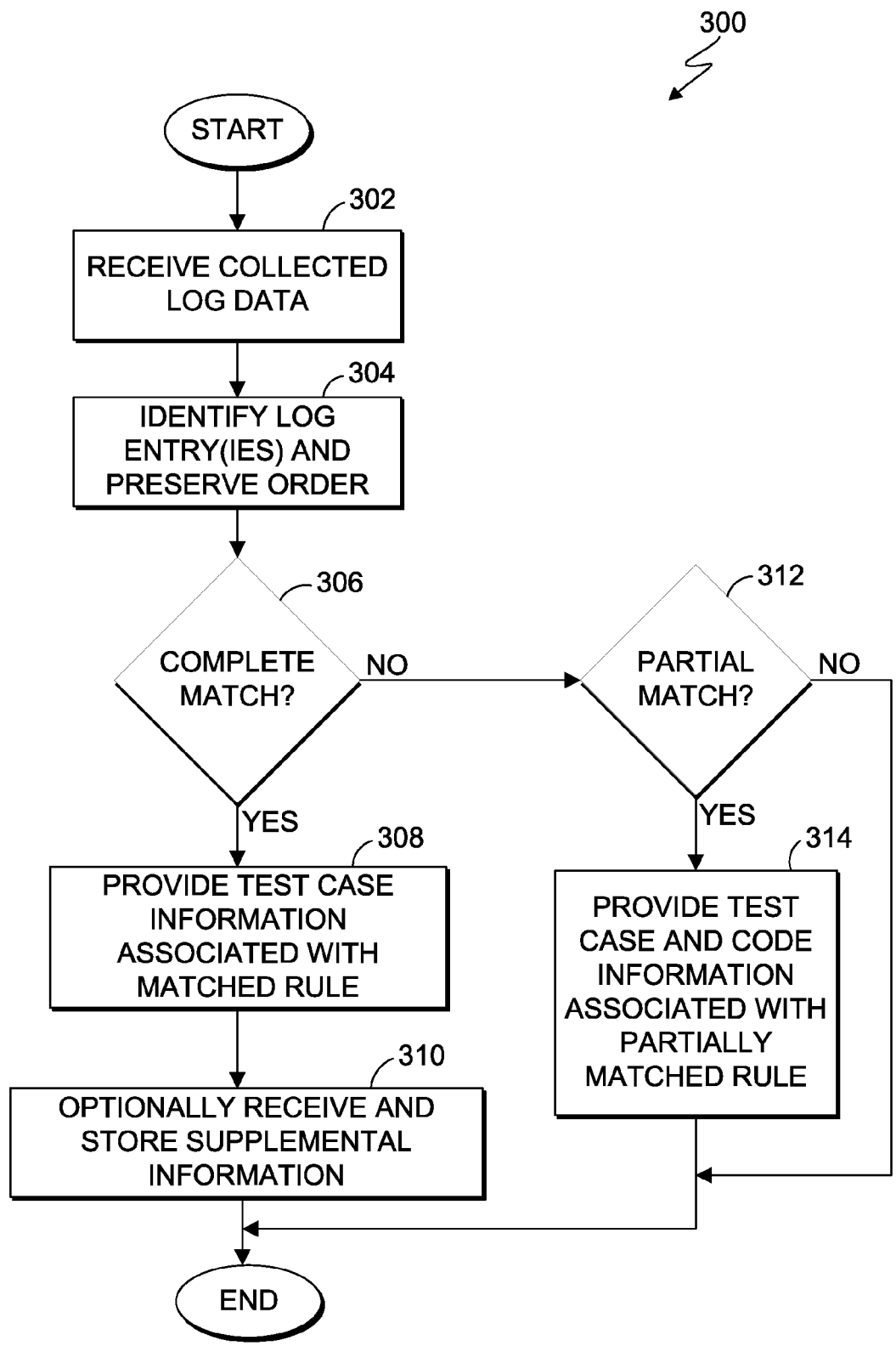
FIG. 3 is a flowchart illustrating operational steps for analyzing log data to identify a corresponding test case based on whether the log data matches a pattern-based rule.

Accordingly, by performing the operational steps of FIG. 2, problem diagnostic knowledge is extracted from test cases and stored in knowledge database 110, where it can be accessed to facilitate future development and/or serviceability of the application, as discussed in greater detail with regard to FIG. 3.

FIG. 3 is a flowchart 300 illustrating operational steps for analyzing log data to identify test case information stored in knowledge database 110 based on whether the log data matches a pattern-based rule, in accordance with an embodiment of the present invention. Again, for illustrative purposes, the following discussion of this embodiment is made with respect to a single pattern-based rule associated with a single test case, but it should be understood that log data may be matched with multiple pattern-based rules and multiple test cases.

In step 302, log analysis program 108 receives collected log data. In this exemplary embodiment, the collected log data may be received from different sources depending on the usage context. For example, in a servicing context, the collected log data may be received from an end-user of an application who has encountered a problem (e.g., via submission of a crash report). Alternatively, during ongoing application development, the collected log data may be received from log collection program 106, as previously discussed with regard to step 202 of flowchart 200.

In step 304, as previously discussed with regard to step 204 of flowchart 200, log analysis program 108 processes the collected log data to identify the one or more log entries therein, while preserving the order in which the one or more log entries appear in the log data.

In step 306, log analysis program 108 determines whether a pattern of one or more log entries appearing in the log data completely matches a pattern-based rule stored in knowledge database 110. In this exemplary embodiment, a pattern of log entries appearing in the log data may satisfy a pattern-based rule if the pattern of log entries completely or partially matches the pattern on which the rule is based. In this exemplary embodiment, as previously discussed, the pattern-based rules are defined with respect to both the content of the one or more log entries and, where appropriate, the order in which they appear in the log data. Accordingly, the pattern of the one or more log entries appearing in the log data completely matches the pattern-based rule when the one or more log entries appearing in the log data possess all of the content and order specified by the rule. The pattern of the one or more log entries appearing in the log data partially matches the pattern-based rule when the one or more log entries appearing in the log data only possess some of the content and/or order specified by the rule. For example, in this exemplary embodiment, a pattern-based rule defining a required pattern of log A, immediately followed by log B, immediately followed by log C, would only be completely matched by a pattern of log A, log B, log C; however, the required pattern would be partially matched by the pattern log A, log B, log D, the pattern log A, log C, log B, and so on. The extent to which partial matches can be made, and how close the match must be (i.e., a tolerance) to satisfy a pattern-based rule, may be configured by a user (e.g., developer or analyst). Similarly, in other embodiments, log analysis program 108 may be configured such that a pattern of log entries appearing in the log data satisfies a pattern-based rule only if the pattern of log entries completely matches the pattern on which the rule is based.

If, in step 306, log analysis program 108 determines that a pattern of one or more log entries appearing in the log data completely matches a pattern-based rule stored in knowledge database 110, then, in step 308, log analysis program 108 indicates the match to the user and provides the user with the information pertaining to the test case that is stored along with the pattern-based rule in knowledge database 110. In other embodiments, log analysis program 108 can also provide the user with the information pertaining to the associated application code.

In step 310, log analysis program 108 may optionally receive supplemental information from the user, which log analysis program 108 may then store and associate with the pattern-based rule and existing knowledge in knowledge database 110. For example, a user may wish to document supplemental symptomatic information and comments.

If, in step 306, log analysis program 108 determines that a pattern of one or more log entries appearing in the log data does not completely match a pattern-based rule stored in knowledge database 110, then, in step 312, log analysis program 108 determines whether a pattern of one or more log entries appearing in the log data partially matches a pattern-based rule stored in knowledge database 110, as previously discussed.

If, in step 312, log analysis program 108 determines that a pattern of one or more log entries appearing in the log data partially matches a pattern-based rule stored in knowledge database 110, then, in step 314, log analysis program 108 indicates the partial match to the user, and provides the user with the information pertaining to the test case and application code that is stored along with the pattern-based rule in knowledge database 110. In this exemplary embodiment, log analysis program 108 cooperates with development environment 104 to direct the user to the line(s) of application code from which the log data resulted. In this manner, the user may review the application code and, with his or her knowledge of the test case information and application code, assess whether the application code should be updated. The user may wish to update the application code not only to debug a problem, but also to ensure that the application code provides complete log coverage of the usage scenario such that a new pattern-based rule can be created to map the scenario to a test case. For example, if after a partial match the user realizes that a usage scenario involves execution of application code that is not written to provide log messaging, the user may update the application code to provide for additional log messaging and, at the same time or a future time, create a new pattern-based rule that will return a complete match when the usage scenario is next encountered.

If, in step 312, log analysis program 108 determines that a pattern of one or more log entries appearing in the log data does not partially match a pattern-based rule stored in knowledge database 110, then the operational steps of FIG. 3 end. However, in such a case, the operational steps of FIG. 2 may be performed to extract knowledge from the log data and store the knowledge in knowledge database 110, as previously discussed.

Accordingly, by performing the operational steps of FIG. 3, problem diagnostic knowledge that was previously extracted from test cases and stored in knowledge database 110 can be used to deterministically identify a test case when encountering a similar usage scenario during future development and/or end-user usage, thereby improving the speed and efficiency with which problems can be identified and resolved. Furthermore, embodiments of the present invention enable developers to identify and rectify instances in which application code may not provide complete log coverage, thereby improving the future serviceability of the application and the likelihood that end-user usage scenarios will be mapped to one or more test cases for which knowledge is stored in knowledge database 110.

EXAMPLE

The following example discusses a hypothetical scenario in which log data is analyzed to create a pattern-based rule associated with a test case, which may then be used to interpret an end-user usage scenario and deterministically identify the matching test case.

In this example, the following portion of log data was generated and collected (e.g., using development environment 104 and log collection program 106) during a test case in which an application's ability to connect to a host server was tested:

Entry 1) Apr. 2, 2099 5:00 PM: ConnectUtil connectToHost INFO: CONREF11 trying to connect to host: 1.111.11.11

Entry 2) Apr. 2, 2099 5:01 PM: ConnectUtil connectToHost ERROR: CONREF31 unable to resolve host: 1.111.11.11

As shown, the application code generated two log entries during the test case: Entry 1 indicates an attempt to connect to the host server, and includes the message identifier "CONREF11"; Entry 2 indicates an error in connecting to the host server, and includes the message identifier "CONREF31".

The collected log data is analyzed (e.g., using log analysis program 108) to create the following pattern-based rule:

Message identifier CONREF11 is followed by CONREF31

The pattern on which the rule is based uses both the content of the log entries (i.e., message identifiers "CONREF11" and "CONREF31") and an order in which the log entries appear (i.e., "CONREF11" must be immediately followed by "CONREF31"). In this example, the pattern-based rule is then stored in a knowledge database (e.g., knowledge database 110), along with the following associated test case and application code information:

Description: Testing ability to connect to host
Result: Connection Failed
Application code: lines 27-46

Later, an end-user may be experiencing connectivity issues while using the application. If the user's log data contains a log entry having the message identifier "CONREF11" followed by a log entry having the message identifier "CONREF31", the developer is provided with the test case and application code information stored with the matched rule in the knowledge database, thereby facilitating rapid identification of a problem which may be causing the user's connectivity issues: failure to connect to the host server.

Figure 4:
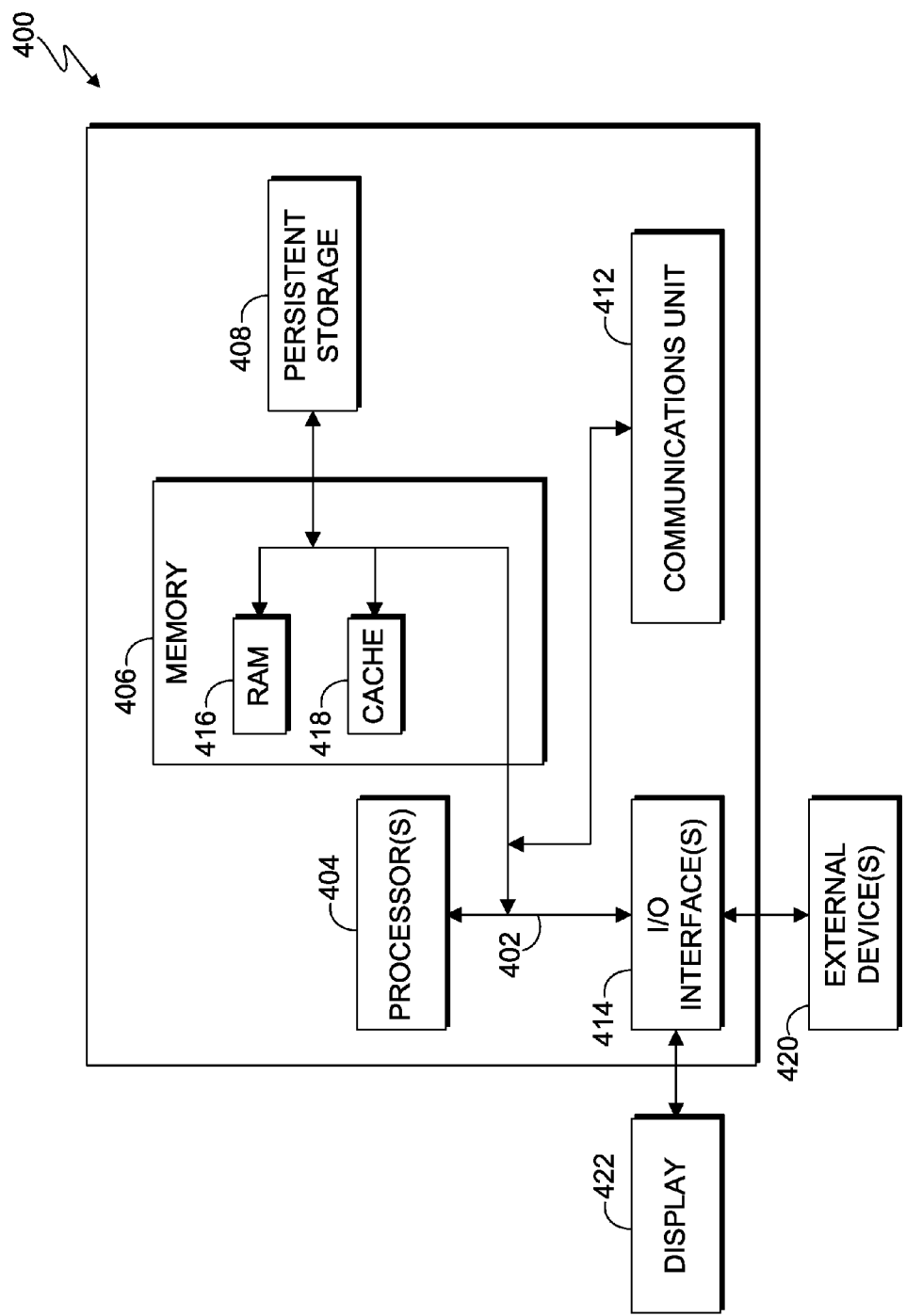
FIG. 4 is a block diagram of internal and external components of the computer system of FIG. 1, in accordance with an embodiment of the present invention.

FIG. 4 is a block diagram of internal and external components of a computer system 400, which is representative of computer system 100, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing computer-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software and data (e.g., development environment 104, log collection program 106, log analysis program 108, knowledge database 110, etc.) is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network. In this exemplary embodiment, communications unit 412 includes network adapters or interfaces such as a TCP/IP adapter cards, wireless Wi-Fi interface cards, or 3G or 4G wireless interface cards, or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 102. For example, I/O interface 414 can provide a connection to one or more external devices 420 such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
identifying a first set of log entries generated during a first execution of an application code in a first scenario, wherein each log entry in the first set of log entries corresponds to a set of lines of code in the application code;
creating a first rule based, at least in part, on a first order of the first set of log entries, wherein the first order is based on a first chronology;
associating the first rule with a first information describing the first scenario, wherein the first information includes a list of aspects of the application code tested during the first execution;
identifying a second set of log entries generated during a second execution of the application code in a second scenario; and
determining the second set of log entries partially satisfies the first rule;
wherein:
at least associating the first rule with the first information describing the first scenario is performed by computer software running on computer hardware.

2. The method of claim 1, wherein determining the second set of log entries partially satisfies the first rule further includes:
determining, based on the first chronology, a first log entry in the first set of log entries appears earlier in the first order than does a second log entry in the first set of log entries;
determining a third log entry in the second set of log entries matches the first log entry;
determining a fourth log entry in the second set of log entries matches the second log entry;
determining a second order of the second set of log entries based on a second chronology; and
determining, based on the second chronology, the third log entry appears earlier in the second order than does the fourth log entry.

3. The method of claim 2, wherein determining the second set of log entries partially satisfies the first rule further includes:
determining a third content of the third log entry matches a first content of the first log entry; and
determining a fourth content of the fourth log entry matches a second content of the second log entry.

4. The method of claim 1, further comprising:
responsive to determining the second set of log entries partially satisfies the first rule, providing, to a user, the first information.

5. The method of claim 1, wherein:
the first scenario is an application development testing scenario; and
the second scenario is an end-user application usage scenario.

6. The method of claim 1, further comprising:
generating a first set of updated lines of code in the application code; and
identifying a third set of log entries generated during a third execution of the application code in a third scenario, wherein each log entry in the third set of log entries corresponds to the first set of updated lines of code.

7. The method of claim 6, further comprising:
creating a second rule based, at least in part, on a third order of the third set of log entries, wherein the third order is based on a third chronology.

8. A computer program product comprising:
a computer readable storage medium having stored thereon:
first instructions executable by a device to cause the device to identify a first set of log entries generated during a first execution of an application code in a first scenario, wherein each log entry in the first set of log entries corresponds to a set of lines of code in the application code;
second instructions executable by a device to cause the device to create a first rule based, at least in part, on a first order of the first set of log entries, wherein the first order is based on a first chronology;
third instructions executable by a device to cause the device to associate the first rule with a first information describing the first scenario, wherein the first information includes a list of aspects of the application code tested during the first execution;
fourth instructions executable by a device to cause the device to identify a second set of log entries generated during a second execution of the application code in a second scenario; and
fifth instructions executable by a device to cause the device to determine the second set of log entries partially satisfies the first rule.

9. The computer program product of claim 8, wherein fifth instructions to determine the second set of log entries partially satisfies the first rule further include:
sixth instructions executable by a device to cause the device to determine, based on the first chronology, a first log entry in the first set of log entries appears earlier in the first order than does a second log entry in the first set of log entries;
seventh instructions executable by a device to cause the device to determine a third log entry in the second set of log entries matches the first log entry;
eighth instructions executable by a device to cause the device to determine a fourth log entry in the second set of log entries matches the second log entry;
ninth instructions executable by a device to cause the device to determine a second order of the second set of log entries based on a second chronology; and
tenth instructions executable by a device to cause the device to determine, based on the second chronology, the third log entry appears earlier in the second order than does the fourth log entry.

10. The computer program product of claim 9, wherein fifth instructions to determine the second set of log entries partially satisfies the first rule further include:
eleventh instructions executable by a device to cause the device to determine a third content of the third log entry matches a first content of the first log entry; and
twelfth instructions executable by a device to cause the device to determine a fourth content of the fourth log entry matches a second content of the second log entry.

11. The computer program product of claim 8, further comprising:
responsive to fifth instructions to determine the second set of log entries partially satisfies the first rule, sixth instructions executable by a device to cause the device to provide, to a user, the first information.

12. The computer program product of claim 8, wherein:
the first scenario is an application development testing scenario; and
the second scenario is an end-user application usage scenario.

13. The computer program product of claim 8, further comprising:
- sixth instructions executable by a device to cause the device to generate a first set of updated lines of code in the application code; and
- seventh instructions executable by a device to cause the device to identify a third set of log entries generated during a third execution of the application code in a third scenario, wherein each log entry in the third set of log entries corresponds to the first set of updated lines of code.

14. The computer program product of claim 13, further comprising:
- eighth instructions executable by a device to cause the device to create a second rule based, at least in part, on a third order of the third set of log entries, wherein the third order is based on a third chronology.

15. A computer system comprising:
- a processor set; and
- a computer readable storage medium;
- wherein:
  - the processor set is structured, located, connected, and/or programmed to execute instructions stored on the computer readable storage medium; and
  - the instructions include:
    - first instructions executable by a device to cause the device to identify a first set of log entries generated during a first execution of an application code in a first scenario, wherein each log entry in the first set of log entries corresponds to a set of lines of code in the application code;
    - second instructions executable by a device to cause the device to create a first rule based, at least in part, on a first order of the first set of log entries, wherein the first order is based on a first chronology;
    - third instructions executable by a device to cause the device to associate the first rule with a first information describing the first scenario, wherein the first information includes a list of aspects of the application code tested during the first execution;
    - fourth instructions executable by a device to cause the device to identify a second set of log entries generated during a second execution of the application code in a second scenario; and
    - fifth instructions executable by a device to cause the device to determine the second set of log entries partially satisfies the first rule.

16. The computer system of claim 15, wherein fifth instructions to determine the second set of log entries partially satisfies the first rule further include:
- sixth instructions executable by a device to cause the device to determine, based on the first chronology, a first log entry in the first set of log entries appears earlier in the first order than does a second log entry in the first set of log entries;
- seventh instructions executable by a device to cause the device to determine a third log entry in the second set of log entries matches the first log entry;
- eighth instructions executable by a device to cause the device to determine a fourth log entry in the second set of log entries matches the second log entry;
- ninth instructions executable by a device to cause the device to determine a second order of the second set of log entries based on a second chronology; and
- tenth instructions executable by a device to cause the device to determine, based on the second chronology, the third log entry appears earlier in the second order than does the fourth log entry.

17. The computer system of claim 16, wherein fifth instructions to determine the second set of log entries partially satisfies the first rule further include:
- eleventh instructions executable by a device to cause the device to determine a third content of the third log entry matches a first content of the first log entry; and
- twelfth instructions executable by a device to cause the device to determine a fourth content of the fourth log entry matches a second content of the second log entry.

18. The computer system of claim 15, further comprising:
- responsive to fifth instructions to determine the second set of log entries partially satisfies the first rule, sixth instructions executable by a device to cause the device to provide, to a user, the first information.

19. The computer system of claim 15, wherein:
- the first scenario is an application development testing scenario; and
- the second scenario is an end-user application usage scenario.

20. The computer system of claim 15, further comprising:
- sixth instructions executable by a device to cause the device to generate a first set of updated lines of code in the application code; and
- seventh instructions executable by a device to cause the device to identify a third set of log entries generated during a third execution of the application code in a third scenario, wherein each log entry in the third set of log entries corresponds to the first set of updated lines of code.

* * * * *